United States Patent
Eagleton et al.

(10) Patent No.: US 10,688,675 B2
(45) Date of Patent: Jun. 23, 2020

(54) PERSONAL CARE BOTTLE AND METHOD OF MANUFACTURE

(71) Applicant: The Gillette Company LLC, Boston, MA (US)

(72) Inventors: Christopher Raymond Eagleton, Devizes (GB); Kelly Daniel Bridges, Randolph, MA (US)

(73) Assignee: The Gillette Company LLC, Boston, MA (US)

( * ) Notice: Subject to any disclaimer, the term of this patent is extended or adjusted under 35 U.S.C. 154(b) by 423 days.

(21) Appl. No.: 15/812,330

(22) Filed: Nov. 14, 2017

(65) Prior Publication Data

US 2018/0200900 A1   Jul. 19, 2018

Related U.S. Application Data

(60) Provisional application No. 62/447,084, filed on Jan. 17, 2017.

(51) Int. Cl.
| | |
|---|---|
| *B26B 21/52* | (2006.01) |
| *A45D 34/00* | (2006.01) |
| *B29C 49/06* | (2006.01) |
| *B26B 21/44* | (2006.01) |
| *B65D 83/00* | (2006.01) |
| *B65B 3/02* | (2006.01) |
| *A45D 34/06* | (2006.01) |
| *B29L 31/00* | (2006.01) |
| *B29C 65/08* | (2006.01) |

(52) U.S. Cl.
CPC ............ *B26B 21/446* (2013.01); *A45D 34/00* (2013.01); *A45D 34/06* (2013.01); *B26B 21/521* (2013.01); *B26B 21/528* (2013.01); *B65B 3/022* (2013.01); *B65D 83/0055* (2013.01); *B29C 49/06* (2013.01); *B29C 65/08* (2013.01); *B29L 2031/7186* (2013.01)

(58) Field of Classification Search
CPC ................................. A45D 2034/005; B26B 21/521; B29C 49/06; B29C 69/00; B65D 83/0055; B22F 3/225
USPC ........................... 215/12.2; 30/41, 41.5, 535
See application file for complete search history.

(56) References Cited

U.S. PATENT DOCUMENTS

| | | | | |
|---|---|---|---|---|
| 3,080,989 | A | * | 3/1963 | Ramsbotham ......... B65D 85/30 215/12.1 |
| 4,676,408 | A | * | 6/1987 | Speitel ................. B65D 83/384 222/183 |
| 5,784,790 | A | | 7/1998 | Carson, III et al. |
| 7,814,661 | B2 | | 10/2010 | Tomassetti |
| 8,793,879 | B2 | | 8/2014 | Jessemey et al. |

(Continued)

OTHER PUBLICATIONS

PCT International Search Report with Written Opinion in corresponding Int'l application PCT/US2018/012147 dated Apr. 20, 2018.

(Continued)

*Primary Examiner* — Anthony D Stashick
*Assistant Examiner* — Raven Collins
(74) *Attorney, Agent, or Firm* — John M. Lipchitz

(57) ABSTRACT

A personal care bottle with a fluid reservoir defining a chamber for holding a fluid. A fluid port is at a proximal end of the fluid reservoir. A gripping sleeve mounted to the fluid reservoir. The gripping sleeve has a locking tab configured to engage a handle.

9 Claims, 4 Drawing Sheets

(56) References Cited

U.S. PATENT DOCUMENTS

| | | |
|---|---|---|
| 9,656,401 B2 | 5/2017 | Burrowes et al. |
| 2005/0132574 A1 | 6/2005 | Tomassetti |
| 2008/0011778 A1* | 1/2008 | Ronsin .................. A45D 34/02 222/94 |
| 2008/0307660 A1 | 12/2008 | Clarke |
| 2012/0102744 A1 | 5/2012 | Forsdike et al. |
| 2013/0145601 A1 | 6/2013 | Burrowes et al. |
| 2014/0224897 A1* | 8/2014 | Garagnon .............. A45D 34/04 239/43 |
| 2015/0121704 A1 | 5/2015 | Bridges et al. |
| 2017/0361344 A1* | 12/2017 | Dutton .................. B05B 15/30 |

OTHER PUBLICATIONS

U.S. Appl. No. 15/812,306, filed Nov. 14, 2017, Christopher Raymond Eagleton et al.

* cited by examiner

PERSONAL CARE BOTTLE AND METHOD OF MANUFACTURE

FIELD OF THE INVENTION

The present invention relates to liquid dispensing shaving razors in general, and, more particularly, to personal care bottles for liquid dispensing shaving razors.

BACKGROUND OF THE INVENTION

Skin care can be of particular importance in improving or enhancing the appearance of men and women. Various products and methods can be used to care for skin. For example, exfoliant scrubs, cleansers, and lotions are sometimes used to maintain healthy-looking skin. Exfoliant scrubs can be used to remove dead skin cells from the surface of the skin, which can give the skin an improved tone. Soaps and other cleansers can be used to remove dirt and excess oil from the skin, which can help prevent clogging of pores. Consequently, acne and other types of skin blemishes can be prevented in some cases. Lotions and various other topical ointments can also be used to deliver nutrients and/or moisturizers to the skin in an effort to improve the appearance and/or the health of the skin. Other types of cosmetic products (e.g., creams and lotions) or drug actives are sometimes used in an attempt to eliminate wrinkling and other signs of aging.

It is generally known that the process of shaving the skin may provide certain skin benefits such as exfoliation and hydration. In general, shaving razors of the wet shave type include a cartridge or blade unit with at least one blade with a cutting edge which is moved across the surface of the skin being shaved by means of a handle to which the cartridge is attached; however, razor assemblies may also include electric foil type shavers. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled (i.e., disposable razor). The connection of the cartridge to the handle provides a pivotal mounting of the cartridge with respect to the handle so that the cartridge angle adjusts to follow the contours of the surface being shaved. In such systems, the cartridge can be biased toward a rest position by the action of a spring-biased plunger (a cam follower) carried on the handle against a cam surface on the cartridge housing.

The shaving process typically includes the application of a shaving aid material (e.g., shaving cream) to the surface and the separate step of shaving the hair using a razor assembly. The shaving aid material often times includes at least one suitable agent (e.g., a lubricating agent, a drag-reducing agent, a depilatory agent, etc.) that enhances the shaving process. Most consumers find this type of preparation to be rather inconvenient because of the need for multiple shaving products, e.g., a wet shaving razor and a skin preparation product, as well as the undesirable necessity for multiple application steps during the wet shaving process. Furthermore, this process can be messy and requires the consumer rinse their hands after applying the shave gel. This multi-step process also results in an overall extended shaving experience which most consumers do not prefer given typical morning hygiene routines. It may, however, be desirable sometimes to apply liquids of other kinds to the skin before, during, or after shaving. It has been found that especially in the case of males who shave facial hair, it is important to provide a shave preparation of some sort prior to shaving in order to adequately hydrate the coarser facial hairs to allow for an easier and closer shave.

In the past, there have been a number of wet shaving product configurations that include a system for conveying a shaving preparation during shaving, e.g. a lubricating liquid, from a reservoir incorporated in the razor structure in the form of a hollowed-out razor handle or even an aerosol can that acts as a razor handle, to a dispensing location near the head of the razor. A number of more recent wet shaving razors have cartridges that are movably mounted, in particular pivotable, relative to the handle structures on which they are mounted either permanently, in the case of disposable safety razors intended to be discarded when the blade or blades have become dulled, or detachably to allow replacement of the blade unit on a reusable handle structure. Many of these types of razors that are capable of conveying a liquid to the skin surface are unfortunately plagued by a number of problems. For instance, the bottles often lack functionality other than storing and transferring a liquid. Accordingly, the functionality, such as securing the bottle in place properly must be provided by the handle, which may not be intuitive and may require the use of both hands. Furthermore, a delaminating bag inside a bottle is often used for delivering a liquid in association with a pump, but these designs are also limited because of the current manufacturing processes. Accordingly, it is difficult to incorporate various design features into the bottle.

SUMMARY OF THE INVENTION

In one aspect, the invention features, in general a personal care bottle with a fluid reservoir defining a chamber for holding a fluid. A fluid port is at a proximal end of the fluid reservoir. A gripping sleeve is mounted to the fluid reservoir. The gripping sleeve has a locking tab configured to engage a handle.

In another aspect, the invention features, in general, a personal care bottle with a fluid reservoir defining a chamber. The body has an air hole towards a distal end and a fluid port towards a proximal end. A delaminating bag is positioned within the chamber for holding a liquid composition. A gripping sleeve is positioned over the distal end of the fluid reservoir. The gripping sleeve is joined to the fluid reservoir providing an air gap that is in communication with the air hole of the chamber facilitating evacuation of the delaminating bag.

In another aspect, the invention features, in general, a method of manufacturing a personal care bottle by molding a fluid reservoir defining a chamber and having a fluid port at a proximal end. A gripping sleeve having a locking tab configured to engage the handle body is injection molded. A distal end of the fluid reservoir is inserted into the gripping sleeve. The gripping sleeve is joined to the fluid reservoir.

In another aspect, the invention features, in general, a method of manufacturing a personal care bottle by molding a fluid reservoir having a fluid port at a proximal end. A delaminating bottle is positioned within a chamber of the fluid reservoir. An air hole is created in the chamber of the fluid reservoir. A gripping sleeve is injection molded. A distal end of the fluid reservoir is inserted into the gripping sleeve. An air gap is provided between the gripping sleeve and the fluid reservoir in communication with the air hole facilitating evacuation of the delaminating bottle during use. The gripping sleeve is joined to the fluid reservoir.

The details of one or more embodiments of the invention are set forth in the accompanying drawings and the description below. Other features and advantages of the invention will be apparent from the description and drawings, and from the claims.

DETAILED DESCRIPTION OF THE INVENTION

Figure 1:
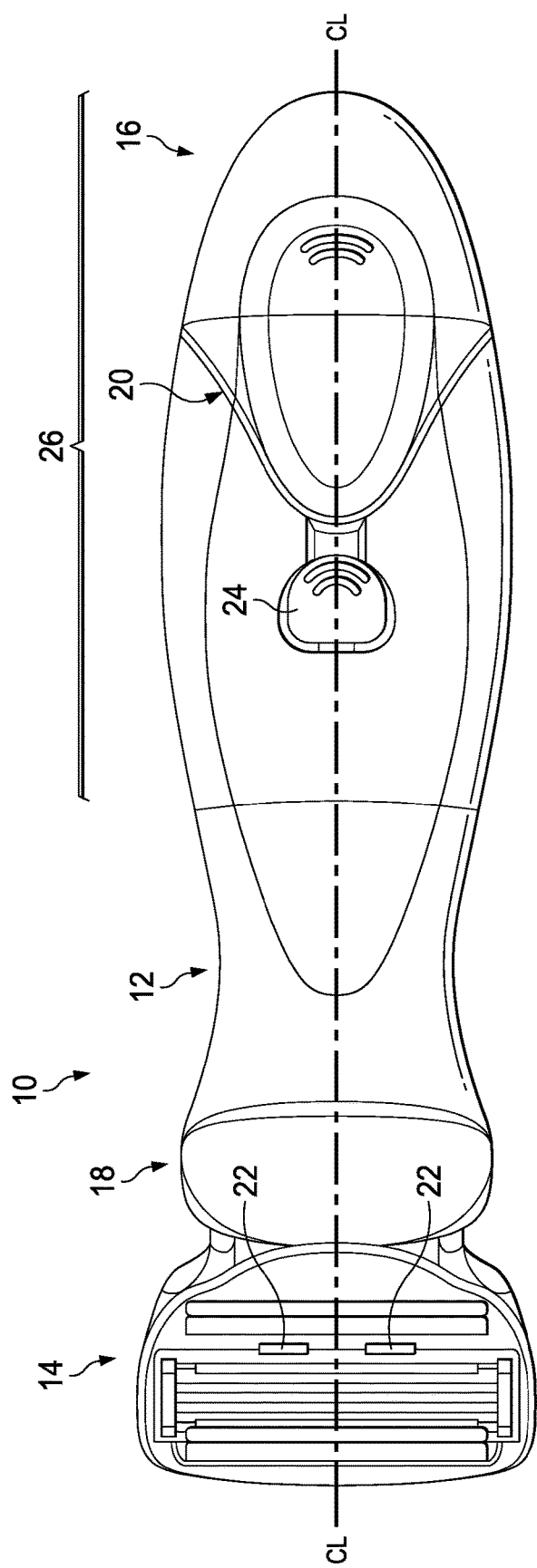
FIG. 1 is a top view of one possible embodiment of a liquid dispensing razor.

The present disclosure is not limited to wet shaving razors, or even razors in general. It is understood that certain aspects of the present disclosure may also be used for dry electric shaving razors that have one or more rotating or reciprocating blades or other personal care appliances (e.g., toothbrushes, depilatory applicators, epilators, or other beauty applicators). Furthermore, it is understood that certain aspects of the present disclosure may be used independently of applying a liquid (e.g., a cartridge and a dispensing unit may be used independently).

The present disclosure is not limited to shaving cartridges in which the blades are rigidly mounted in a fixed position relative to a guard and/or a cap. If the blades are capable of movement, then the geometric parameters stipulated herein are those which apply when the blades are in their normal rest positions. Each of the illustrated safety razor blade units are intended to be mounted on a razor handle. The blade unit may be permanently attached to the handle, e.g., in a disposable razor, or may be formed as a cartridge adapted to be mounted releasably to the handle. The blade unit may be pivotally mounted to the handle or may be fixedly attached to the handle.

One or more blades may be mounted to a housing. The term "mounted to" may be defined as any of the following disclosed herein. The cutting blade may be supported firmly by the housing to remain substantially fixed in the positions in which they are depicted (subject to any resilient deformation which the blades undergo under the forces applied against the blades during shaving). Alternatively, the blades may be supported for limited movement against spring restoring forces, e.g., in a downward direction as viewed in the drawings. The basic construction and assembly of the blade units may be conventional.

Referring to FIG. 1 a top view of one possible embodiment of a liquid dispensing razor 10 is shown. The liquid dispensing razor 10 may include a handle body 12, a shaving razor cartridge 14, and a personal care bottle 16. It is understood that the shaving razor cartridge 14 may include other personal care instruments, such as toothbrushes. The shaving razor cartridge 14 may be mounted to a first end 18 of the handle body 12. In certain embodiments, the shaving razor cartridge 14 may be pivotally and/or removably mounted to the shaving razor cartridge 14. As will be explained in greater detail below, the personal care bottle 16 may be removably mounted to a distal end 20 of the handle body 12 (e.g., opposite the shaving razor cartridge 14). The personal care bottle 16 may contain a liquid reservoir (not shown) in communication with one or more ports 22 of the shaving razor cartridge 14 to aid in the shaving process. The personal care bottle 16 may have a locking tab 24 to secure the personal care bottle 16 to the handle body 12. The locking tab 24 may be positioned along a center line "CL" of the personal care bottle 16 to improve stability and security. The locking tab 24 may allow for quick and easy removal and replacement of the personal care bottle 16. In certain embodiments, the personal care bottle 16 may form a substantial part of a gripping region 26 of the liquid dispensing razor 10.

Figure 2:
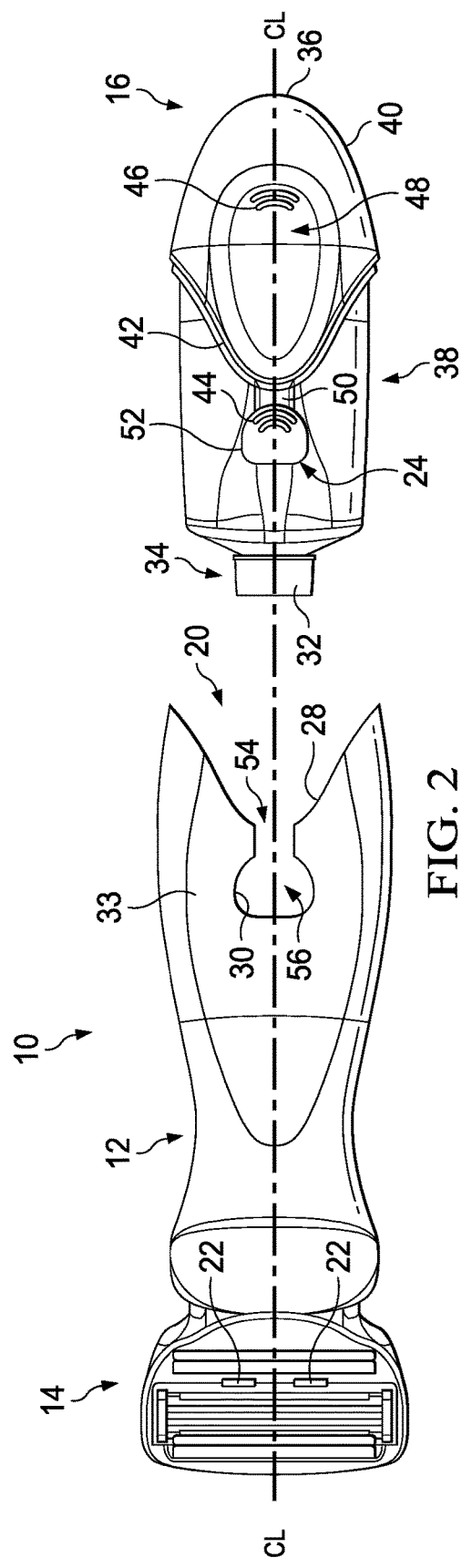
FIG. 2 is a top view of a handle and personal care bottle of the liquid dispensing razor of FIG. 1.

FIG. 2 is a top view of the liquid dispensing razor 10 is illustrated with the personal care bottle 16 removed from the handle body 12. In certain embodiments, the distal end 20 of the handle body 12 may have a concave form 28 configured to receive a corresponding end of the personal care bottle 16. The distal end 20 of the handle body 12 may define an opening 30 dimensioned to receive the locking tab 24 to secure the personal care bottle 16 to the handle body 12. The opening 30 may be positioned on an outer surface 33 of the handle body 12. The opening 30 on the outer surface 33 may provide for an intuitive feature for signaling the consumer how to remove the personal care bottle 16. For example, if the locking features were located inside the handle body 12, a consumer may not readily understand how to remove the personal care bottle 16.

The personal care bottle 16 may have a fluid port 32 for facilitating delivery of liquid to the one or more ports 22 of the shaving razor cartridge 14. The fluid port 32 may be located at a proximal end 34 of the personal care bottle 16. The locking tab 24 may be spaced apart from the fluid port 32. For example, the locking tab 24 may be positioned between a distal end 36 of the personal care bottle 16 and the fluid port 32. The personal care bottle 16 may include a fluid reservoir 38 containing a liquid composition, such as a shaving aid. A gripping sleeve 40 may be mounted over the fluid reservoir 38. In certain embodiments, the handle body 12 and the personal care bottle 16 may have corresponding mating portions. For example, the concave form 28 of the distal end 20 of the handle body 12 may engage a convex end portion 42 of the gripping sleeve 40. The engagement of the concave form 28 and the convex end portion 42 may facilitate securing the personal care bottle 16 and the handle body 12 by resisting twisting forces. The locking tab 24 may extend from the convex end portion 42 of the gripping sleeve 40, to provide a gradual, intuitive lead in for the locking tab 24 into the opening 30

The gripping sleeve 40 and the fluid reservoir 38 may be made using two different manufacturing methods to allow for different shapes having different functionality. For example, the fluid reservoir 38 may be blow molded and the gripping sleeve 40 may be injection molded. Blow molding may allow for the manufacture of a liquid container and the injection molding process may provide for various gripping features and the locking tab 24. The locking tab 24 may have at least one gripping member 44, such as a curved rib. The at least one gripping member 44 may provide a tactile and visual indication to a consumer to disengage the locking tab 24 to remove the personal care bottle 16 from the handle body 12. The gripping sleeve 40 may have other gripping members 46 to aid in removal of the personal care bottle 16. The gripping sleeve 40 may have a recessed top surface 48 between the locking tab 24 and the distal end 36. The gripping sleeve 40 may form the distal end 36 of the personal care bottle 16. The gripping member 46 may be positioned within the recess to provide an ergonomic grip grasp for a consumer. The locking tab 24 may have a land 50 extending from the gripping sleeve 40 and an enlarged end 52. The opening 30 may include a slot 54 that leads into a larger open region 56.

The locking tab 24 may have a first position with the enlarged end 52 positioned within the open region 56 and the land 50 positioned within the slot 54 (e.g., as shown in FIG. 2). A consumer may depress the enlarged end 52 and slide the personal care bottle 16 away from the handle body 12 to disengage the locking tab 24 from the open region 56. The enlarged end 52 may be larger than the slot 54 to allow the enlarged end 52 to slide under the slot 54 as the personal care bottle 16 is detached. A consumer may secure the personal care bottle 16 to the handle body 12 by sliding the enlarged end 52 over or on top of the slot 54. The enlarged end 52 may then drop into and engage the open region 52 to secure the locking tab 24 in place.

Figure 3:
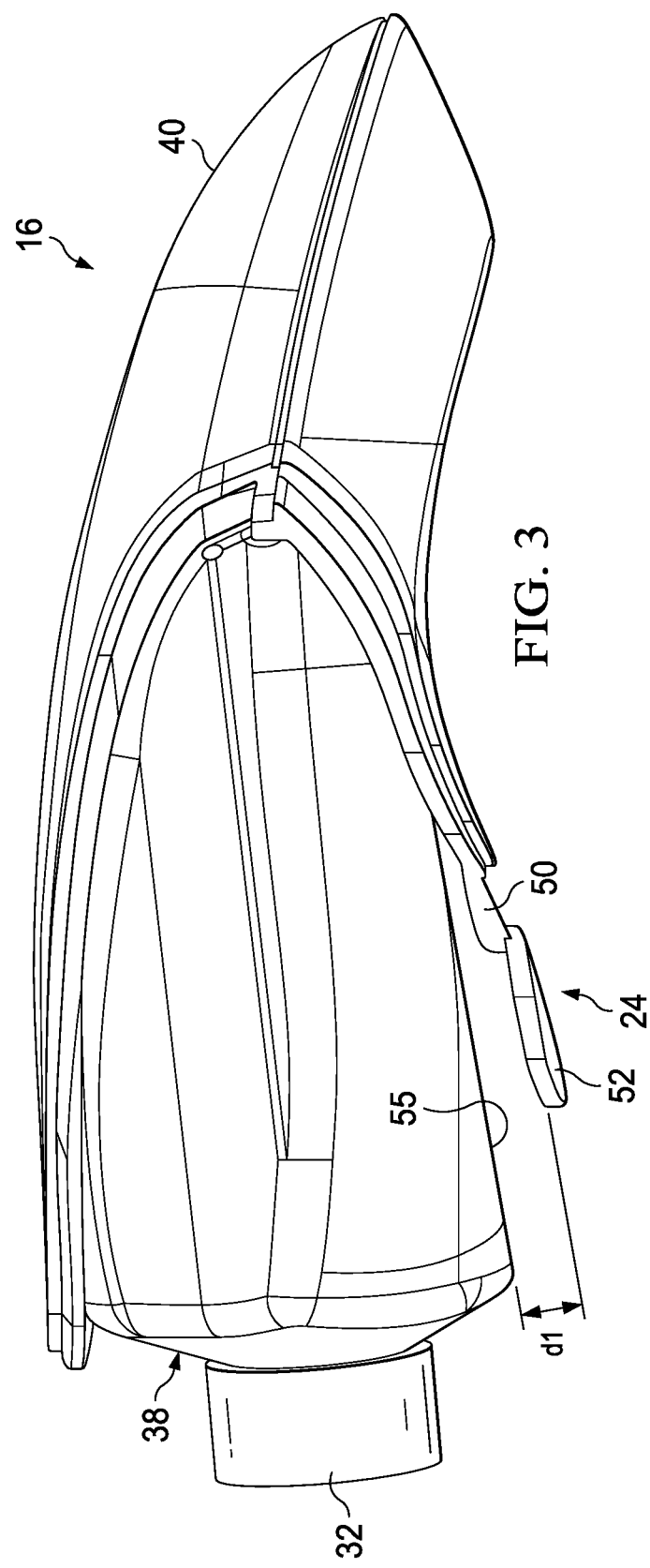
FIG. 3 is a side view of the personal care bottle of FIG. 2.

Referring to FIG. 3, a side view of the personal care bottle 16 is shown. The gripping sleeve 40 of the personal care bottle 16 may have an outer rim with a shoulder that is positioned beneath the handle body 12 of FIG. 2. The locking tab 24 may be unsupported and have a bottom surface spaced apart from the fluid reservoir 38, thus allowing the locking tab 24 to deflect during attachment and removal with the handle body 12 of FIGS. 1 and 2. In certain embodiments, the locking tab 24 may be stepped (e.g., the land 50 may be positioned closer to the fluid reservoir 38 than the enlarged end 52). The enlarged end 52 may be spaced apart from the fluid reservoir 38 (i.e., an outer surface 55 of the fluid reservoir 38) by a distance "d1" of about 0.5 mm to about 3 mm. Accordingly, the locking tab 24 may deflect, acting as a cantilever beam during attachment and removal of the personal care bottle 16. The locking tab 24 may be spaced apart from the fluid port 32 to separate the locking functionality with the fluid delivery functionality of the personal care bottle 16. A locking feature that is integrated with the fluid port may put stress on the fluid port, potentially damaging the fluid delivery mechanism. In addition, locking mechanisms may be difficult to design into a fluid port, for example, due to various design limitations of blow molding.

Figure 4:
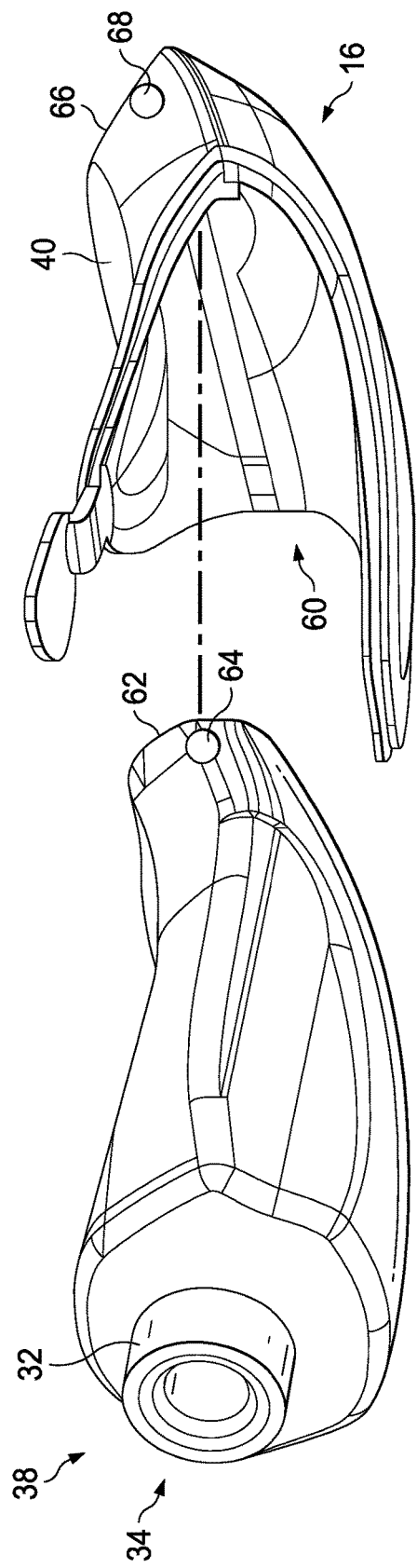
FIG. 4 is a perspective assembly view of the personal care bottle of FIG. 3.

Referring to FIG. 4 is a perspective assembly view of the personal care bottle 16 of FIG. 3 is shown. The gripping sleeve 40 may define a cavity 60 dimensioned to receive a distal end 62 of the fluid reservoir 38. The fluid reservoir 38 may define an air hole 64 toward the distal end 62. As will be described in greater detail below, the fluid reservoir 38 may comprise a delaminating bag (not shown) that requires sufficient air to evacuate properly to remove liquid contained in the delaminating bag. The gripping sleeve 40 may cover up the air hole 64, thus preventing sufficient evacuation. Accordingly, a distal end portion 66 of the gripping sleeve 40 may define an air hole 68 that is in communication with the air hole 62 to allow evacuation of the delaminating bag (not shown). The positioning of the air holes 62 and 68 opposite the fluid port 32 at the proximal end 34 of the fluid reservoir 38 may improve the evacuation of the delaminating bag (not shown).

Figure 5:
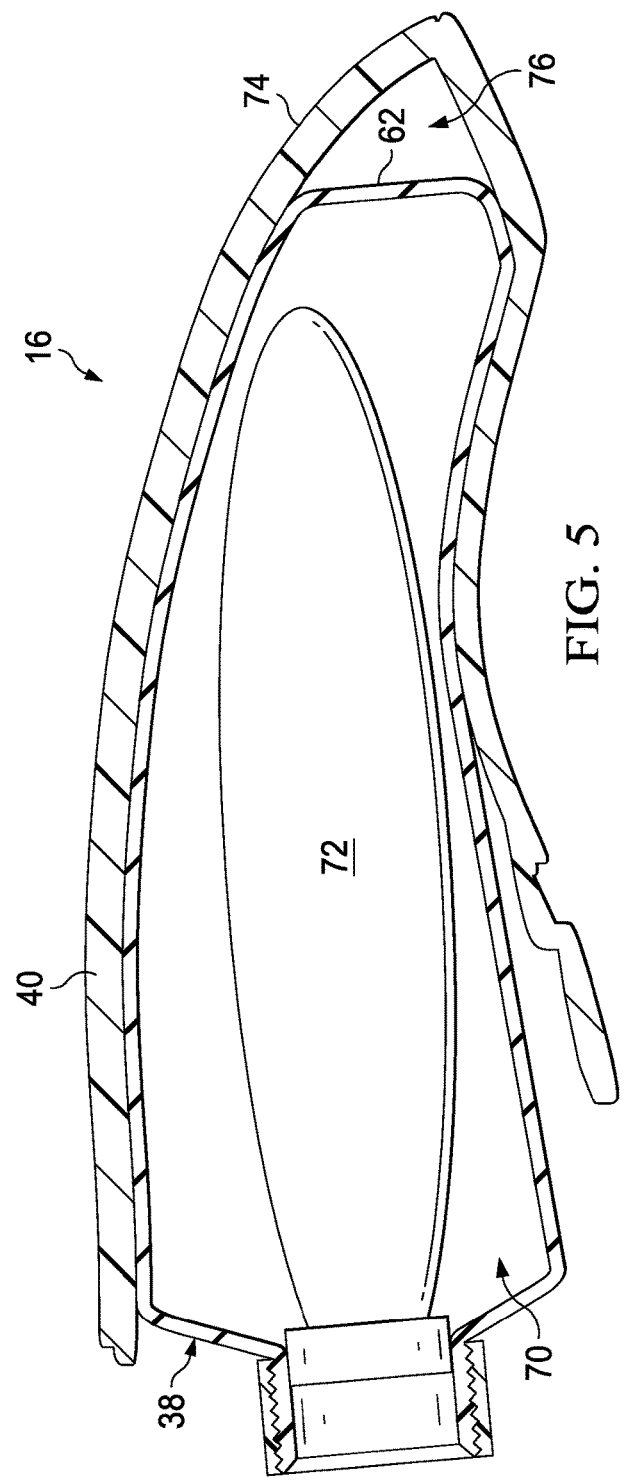
FIG. 5 is a cross section view of the personal care bottle of FIG. 2.

Referring to FIG. 5, a cross section view of the personal care bottle 16 of FIG. 3 is shown. The fluid reservoir 38 may define a chamber 70 configured to contain a delaminating bag 72. The delaminating bag 72 may contain a liquid composition, such as a shave prep or moisturizer. The distal end 62 of the fluid reservoir 38 may be spaced apart from a distal end inner surface 74 of the gripping sleeve 40 to provide an air gap 76 to facilitate the evacuation of the delaminating bag 72. It is understood the personal care bottle 16 may include the air gap 76 and/or the air hole 68 (FIG. 4) to facilitate evacuation of the delaminating bag 72.

Figure 6:
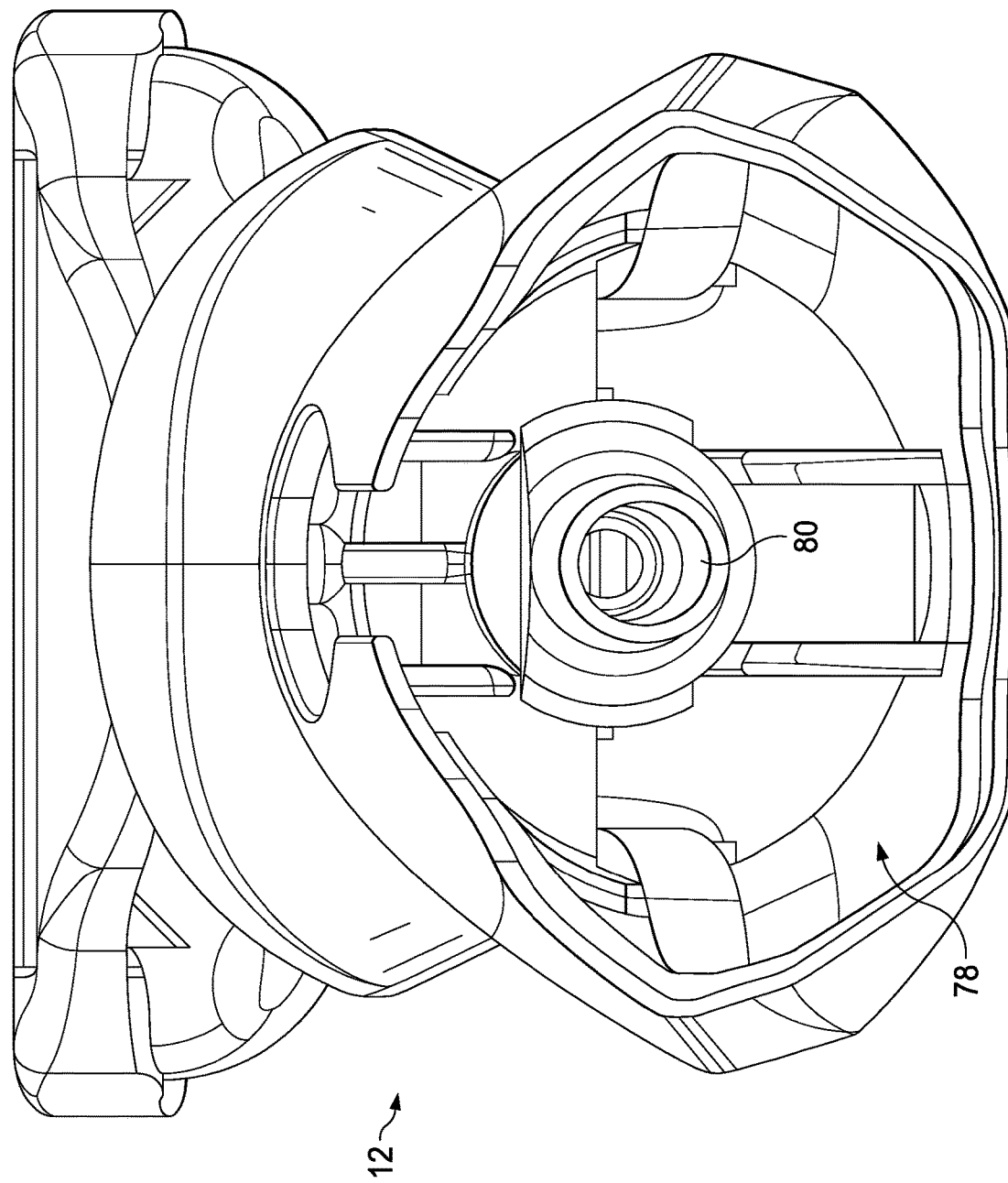
FIG. 6 is an end view of a handle body of the liquid dispensing razor of FIG. 1.

Referring to FIG. 6, an end view of the handle body 12 is shown. The handle body 12 may define a cavity 78 dimensioned to receive at least a portion of the personal care bottle 16. For example, the fluid port 32 (FIG. 2) may be positioned within the cavity 78 to engage a conduit 80 that facilitates delivery of liquid to the ports 22 of the shaving razor cartridge 14 (FIG. 2).

Combinations:

An example is below:

A. A personal care bottle comprising:
   a fluid reservoir defining a chamber for holding a fluid;
   a fluid port at a proximal end of the fluid reservoir; and
   a gripping sleeve mounted to the fluid reservoir, the gripping sleeve having a locking tab configured to engage a handle.

B. The personal care bottle according to Paragraph A wherein the locking tab has an unsupported end spaced apart from an outer surface of the body.

C. The personal care bottle according to any of Paragraphs A or B wherein the locking tab is positioned along a center line of the sleeve.

D. The personal care bottle according to any one of Paragraphs A-C wherein the locking tab has stepped region.

E. The personal care bottle according to any one of Paragraphs A-D wherein the locking tab has at least one gripping member.

F. The personal care bottle according to any one of Paragraphs A-E wherein the locking tab extends from a convex end portion of the sleeve.

G. The personal care bottle according to any one of the Paragraphs A-F wherein the locking tab is spaced apart from the fluid port.

H. The personal care bottle according to any one of Paragraphs A-G wherein the gripping sleeve has a rim with a shoulder.

I. The personal care bottle according to any one of Paragraphs A-H wherein the gripping sleeve has a recessed top surface between the locking tab and a distal end of the gripping sleeve.

J. The personal care bottle of Paragraph I wherein the recessed area has at least one gripping member.

K. A personal care bottle according to any one of Paragraphs A-J wherein the fluid reservoir comprises a delaminating bottle containing a liquid composition and a hole extending into the fluid reservoir on an opposite end as the port.

L. The personal care bottle of Paragraph K wherein the gripping sleeve is joined to the fluid reservoir providing an air gap between the gripping sleeve and the fluid reservoir facilitating evacuation of the delaminating bottle during use.

M. The personal care bottle of Paragraph L wherein the air gap comprises an opening extending through an outer surface of the gripping sleeve.

N. A method of manufacturing a personal care bottle comprising:
   molding a fluid reservoir defining a chamber and having a fluid port at a proximal end;
   injection molding a gripping sleeve having a locking tab configured to engage a handle body;
   inserting a distal end of the fluid reservoir into the gripping sleeve; and
   joining the gripping sleeve to the fluid reservoir.

O. The method of Paragraph M wherein said molding comprises injection blow molding
P. The method of Paragraph N or O wherein said inserting comprises spacing the locking tab apart from the fluid reservoir wherein the locking tab is unsupported.
Q. The method of Paragraph P wherein said joining comprises ultrasonic welding the sleeve to the bottle.
R. The method of Paragraph N further comprising positioning an air gap between the gripping sleeve and the fluid reservoir.
S. The method of Paragraph R wherein the air gap comprises an air hole in the fluid reservoir.
T. The method of Paragraph R further comprising forming a collapsible bag within the chamber, wherein the air gap facilitates the evacuation of the collapsible bag during use.
U. A personal care bottle comprising:
    a fluid reservoir defining a chamber, the body having an air hole towards a distal end and a fluid port towards a proximal end;
    a delaminating bag positioned within the chamber for holding a liquid composition;
    a gripping sleeve positioned over the distal end of the fluid reservoir, wherein the gripping sleeve is joined to the fluid reservoir providing an air gap that is in communication with the air hole of the chamber facilitating evacuation of the delaminating bag.
V. The personal care bottle of Paragraph U wherein the air gap comprises a hole in the gripping sleeve that is in communication with the air hole of the fluid reservoir.
W. The personal care bottle of Paragraph U wherein the gripping sleeve has an inner distal end surface that is spaced apart from a distal end of the fluid reservoir providing the air gap allowing evacuation of the delaminating bag during use.
X. A method of manufacturing a personal care bottle comprising:
    molding a fluid reservoir having a fluid port at a proximal end;
    positioning a delaminating bottle within a chamber of the fluid reservoir;
    creating an air hole in the fluid reservoir extending into the chamber;
    inserting a distal end of the fluid reservoir into a gripping sleeve;
providing an air gap between the gripping sleeve and the fluid reservoir in communication with the air hole facilitating evacuation of the delaminating bottle during use; and
    joining the gripping sleeve to the fluid reservoir.
Y. The method of Paragraph X wherein said providing an air gap comprises creating a hole in the gripping sleeve that is in communication with the air hole of the fluid reservoir.
Z. The personal care bottle of Paragraph X wherein said providing an air gap comprises spacing an inner surface of the gripping sleeve apart from an outer surface of the fluid reservoir providing the air gap allowing evacuation of the delaminating bag during use.
AA. The method of Paragraph X wherein said molding comprises injection blow molding.
AB. The method of Paragraph X wherein said securing comprises ultrasonic welding the gripping sleeve to the bottle
AC. The method of Paragraph X wherein said joining comprises applying an adhesive between the gripping sleeve and the fluid reservoir.
AD. The method of Paragraph X further comprising filling the delaminating bag with a liquid composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A method of manufacturing a personal care bottle comprising:
    molding a fluid reservoir defining a chamber and having a fluid port at a proximal end;
    injection molding a gripping sleeve having a locking tab configured to engage a handle body;
    inserting a distal end of the fluid reservoir into the gripping sleeve; and
    joining the gripping sleeve to the fluid reservoir.
2. The method of claim 1 wherein said molding comprises injection blow molding.
3. The method of claim 1 wherein said inserting comprises spacing the locking tab apart from the fluid reservoir wherein the locking tab is unsupported.
4. The method of claim 1 wherein said joining comprises ultrasonic welding the sleeve to the bottle.
5. The method of claim 1 wherein said joining comprises applying an adhesive between the gripping sleeve and the fluid reservoir.
6. The method of claim 1 further comprising positioning an air gap between the gripping sleeve and the fluid reservoir.
7. The method of claim 5 wherein the air gap comprises an air hole in the fluid reservoir.
8. The method of claim 6 further comprising forming a collapsible bag within the chamber, wherein the air gap facilitates the evacuation of the collapsible bag during use.
9. The method of claim 8 further comprising filling the delaminating bag with a liquid composition.

* * * * *